US007953082B2

(12) United States Patent
Cho et al.

(10) Patent No.: US 7,953,082 B2
(45) Date of Patent: May 31, 2011

(54) METHOD AND SYSTEM FOR PACKET CLASSIFICATION WITH REDUCED MEMORY SPACE AND ENHANCED ACCESS SPEED

(75) Inventors: Sheng-Hsun Cho, Taipei (TW);
Sheng-De Wang, Taipei (TW)

(73) Assignee: National Taiwan University, Taipei (TW)

( * ) Notice: Subject to any disclaimer, the term of this patent is extended or adjusted under 35 U.S.C. 154(b) by 116 days.

(21) Appl. No.: 12/147,916

(22) Filed: Jun. 27, 2008

(65) Prior Publication Data

US 2009/0185568 A1 Jul. 23, 2009

(30) Foreign Application Priority Data

Jan. 21, 2008 (TW) .............................. 97102150 A

(51) Int. Cl.
*H04L 12/28* (2006.01)
(52) U.S. Cl. .................... 370/389; 370/395.31
(58) Field of Classification Search .................. 370/389, 370/395.31
See application file for complete search history.

(56) References Cited

U.S. PATENT DOCUMENTS

| 7,508,825 | B2* | 3/2009 | Jason, Jr. .............. | 370/389 |
| 7,525,958 | B2* | 4/2009 | Kumar et al. .......... | 370/386 |
| 7,586,851 | B2* | 9/2009 | Panigrahy et al. ..... | 370/252 |
| 7,619,983 | B2* | 11/2009 | Panigrahy ............. | 370/252 |
| 7,697,518 | B1* | 4/2010 | de Wit ................. | 370/389 |

OTHER PUBLICATIONS

Li, Ji, et al. "Scalable Packet Classification Using Bit Vector Aggregating and Folding", 2006,139-144, Paralec, International Symposium on Parallel Computing in Electrical Engineering, Cambridge, MA, USA.
Baboescu, Florin, et al. "Scalable Packet Classification", 2005, 2-14, vol. 13(1), IEEE Press, Piscataway, NJ, USA.
Srinivasan, T., et al. "Scalable and Parallel Aggregated Bit Vector Packet Classification Using Prefix Computation Model", 2006, 139-144, IEEE Computer Society Washington, DC, USA.

* cited by examiner

*Primary Examiner* — Dang T Ton
*Assistant Examiner* — Brian O'Connor
(74) *Attorney, Agent, or Firm* — Pearne & Gordon LLP

(57) ABSTRACT

A method and system for packet classification is proposed for applications such as firewalls, intrusion detection, policy-based routing, and network service differentiations, within network systems such as Internet or intranet/extranet systems. The proposed method and system is characterized by the use of protocol-oriented rule rearrangement, the probable bit vector (PBV) based on the aggregated bit vectors (ABV) and folded bit vectors (FBV), an ABV-FBV index table dataset whose data structure is based on a featured split full-tree schema, and a DCBV (Don't-Care Bit Vector) dataset for packet classification. The combination of these features allows the packet classification to be implemented with a reduced amount of memory and access time during operation.

20 Claims, 15 Drawing Sheets

| Rule | Field 1<br>Source IP Address | Field 2<br>Destination IP Address | Field 3<br>Source Port | Field 4<br>Destination Port | Field 5<br>Protocol |
|---|---|---|---|---|---|
| R(0) | xxxx | xxxx | xxxx | xxxx | xxxx |
| R(1) | xxxx | xxxx | xxxx | xxxx | xxxx |
| R(2) | xxxx | xxxx | xxxx | xxxx | xxxx |
| .... | .... | .... | .... | .... | .... |
| R(n-1) | xxxx | xxxx | xxxx | xxxx | xxxx |

FIG. 3A

| Field | Length in Packet Header | Represtatation | Length in Rule Database |
|---|---|---|---|
| Source IP Address | 32bit | Prefix | 40bit |
| Destination IP Address | 32bit | Prefix | 40bit |
| Source Port | 16bit | Range | 32bit |
| Destination Port | 16bit | Range | 32bit |
| Protocol | 8bit | Constant | 8bit |

FIG. 3B

|   | don't care | 0 | 1 | 2 | 3 | ... | 255 |
|---|---|---|---|---|---|---|---|
| 0 | 11111111 | <u>1111</u> | 000 | 0000 | 0000 | ... | 0000 |
| 1 | 11111111 | 0000 | <u>111</u> | 0000 | 0000 | ... | 0000 |
| 2 | 11111111 | 0000 | 000 | <u>1111</u> | 0000 | ... | 0000 |
| 255 | 11111111 | 0000 | 000 | 0000 | 0000 | ... | <u>1111</u> |
|  | 2nd search If needed (401) | 1st search (402) | | | | | |

FIG. 3C

| Rule No. | Prefix of Field 1 | Prefix Length | Prefix of Field 2 | Prefix Length |
|---|---|---|---|---|
| 0 | 1100 | 2 | 0100 | 2 |
| 1 | 1100 | 2 | 0110 | 3 |
| 2 | 0000 | 1 | 1110 | 3 |
| 3 | 1100 | 2 | 0100 | 2 |
| 4 | 0100 | 3 | 1011 | 4 |
| 5 | 0100 | 3 | 1100 | 2 |
| 6 | 0000 | 2 | 1000 | 1 |
| 7 | 0111 | 4 | 0000 | 0 |

FIG. 5A

| Field 1 | | Field 1 | |
|---|---|---|---|
| Prefix | Mapped Rule(s) | Prefix | Mapped Rule(s) |
| xxxx | | xxxx | 7 |
| 0xxx | 2 | 0xxx | 7oxxx |
| 1xxx | | 1xxx | 6,7 |
| 00xx | 2,6 | 01xx | 0,3,7 |
| 01xx | 1 | 10xx | 6,7 |
| 11xx | 0,3 | 11xx | 5,6,7 |
| 010x | 1,2,4,5 | 011x | 0,1,3,7 |
| 011x | 1,2 | 101x | 6,7 |
| 0111 | 1,2,7 | 111x | 2,5,6,7 |
| | | 1011 | 4,6,7 |

FIG. 5B

METHOD AND SYSTEM FOR PACKET CLASSIFICATION WITH REDUCED MEMORY SPACE AND ENHANCED ACCESS SPEED

BACKGROUND OF THE INVENTION

1. Field of the Invention

This invention relates to computer network technology, and more particularly, to a method and system for packet classification on a network system, such as Internet or an intranet/extranet system, for applications such as firewalls, policy-based routing, and network service differentiations.

2. Description of Related Art

Packet classification is an important function of network systems for applications such as firewalls and intrusion detection, policy-based routing, and network service differentiations, for use to identify the attributes of all incoming packets based on their headers. When a networking device, such as an enterprise-class server or router, receives an incoming packet, the first step is to determine the type of the packet, such as what protocol is being used by the packet, what ToS (Type of Service) or QoS (Quality of Service) is to be assigned to the packet, the source and destination of the packet (which might be used to indicate, for example, whether the packet is coming from a malignant source), to name just a few.

In actual implementation, packet classification is realized by using a user-predefined rule database which specifies the mapping of predefined field values in the packet header to a set of rules, each rule representing a particular type of action or service that is to be performed on the packet. For example, if the source IP address of an incoming packet is matched to a rule that specifies an unauthorized IP address, the action to be performed on the incoming packet might be to discard the packet or to trace back to its originating source.

Typically, the total number of rules in a rule database might be in the range from several dozens to several thousands. Therefore, the hardware/software implementation of packet classification typically requires a huge amount of memory space for storage of the rule database and also requires a significant amount of access time to search through the rule database for matched rules.

In view of the aforementioned problem, it has been a research effort in the computer network industry for solutions that implement packet classification with reduced memory space and enhanced access speed. For example, the technical paper "SCALABLE PACKET CLASSIFICATION USING BIT VECTOR AGGREGATING AND FOLDING" by Li et al; "SCALABLE PACKET CLASSIFICATION" by Baboescu et al; and "SCALABLE AND PARALLEL AGGREGATED BIT VECTOR PACKET CLASSIFICATION USING PREFIX COMPUTATION MODEL"; to name a few. These papers teach the use of aggregated bit vectors (ABV) and folded bit vectors (FBV), which are a compacted form of the so-called Lucent Bit Vector, to help reduce memory space and enhance access speed during the operation of packet classification.

One drawback to the above-mentioned ABV/FBV scheme for packet classification, however, is that it requires the use of a trie-based data structure for mapping the packet header information to corresponding ABV/FBV values, and the use of the trie-based data structure still requires a significant amount of memory space for storage.

SUMMARY OF THE INVENTION

It is therefore an objective of this invention to provide a new method and system for packet classification on a network system with the purpose of providing an improved performance over the prior art.

The packet classification method and system according to the invention is designed for use with a network system for applications such as firewalls, intrusion detection, policy-based routing, and network service differentiations.

The packet classification method according to the invention comprises: (M10) a preprocessing stage; and (M20) a packet processing stage; wherein the preprocessing stage includes: (M11) performing a protocol-oriented rule rearrangement process on the original rule database based on user-preset values in the protocol field of the original rule database; (M13) building a classification lookup database file which at least includes an ABV-FBV index table dataset and a protocol range dataset based on the rearranged rule database; and (M13) storing the classification lookup database file into the embedded memory unit of the networking device; and where in the packet processing stage is performed in response to an incoming packet to the networking device during active operation of the networking device, and which includes: (M21) checking the protocol of the incoming packet and using the protocol value of the incoming packet as an index to retrieve a corresponding packet-specific protocol range from the protocol range dataset prestored in the embedded memory unit of the networking device; (M22) checking the source IP address and destination IP address of the incoming packet and using the source IP address and destination IP address as indexes to retrieve corresponding sets of aggregated bit vectors and folded bit vectors from the ABV-FBV index table dataset prestored in the embedded memory unit of the networking device; (M23) generating a probable bit vector (PBV) based on each retrieved pair of aggregated bit vector and folded bit vector from the ABV-FBV index table dataset; and (M24) performing a search through the probable bit vector within the don't-care protocol range and the packet-specific protocol range to find even, rule in the original rule database that is matched to the incoming packet, and then returning the higher-prioritized rule as the end result of the packet classification.

Defined as a system for implementing the above-defined method, the invention comprises the following components: (A) a preprocessing unit; and (B) a packet processing unit; wherein the preprocessing unit includes: (A1) a rule rearrangement module; (A2) a classification lookup data building module; and (A3) a storage module; whereas the packet processing unit includes: (B0) a packet listening module; (B1) a protocol range reading module; (B2) an ABV-FBV lookup module; (B3) a PBV generating module; and (B4) a rule search module.

The packet classification method and system according to the invention is characterized by the use of protocol-oriented rule rearrangement, the probable bit vector (PBV) based on the aggregated bit vectors (ABV) and folded bit vectors (FBV), an ABV-FBV index table dataset whose data structure is based on a featured split full-tree schema, and a DCBV (Don't-Care Bit Vector) dataset for packet classification. The combination of these features allows the packet classification to be implemented with a reduced amount of memory and access time during operation.

BRIEF DESCRIPTION OF DRAWINGS

The invention can be more fully understood by reading the following detailed description of the preferred embodiments, with reference made to the accompanying drawings, wherein:

FIGS. 3A-3C are schematic diagrams used to depict the basic concept of a protocol-oriented rule rearrangement scheme utilized by the invention for packet classification;

FIGS. 5A-5C are schematic diagrams used to depict the basic concept of a split full-tree schema utilized by the invention for building an ABV-FBV index table dataset;

DETAILED DESCRIPTION OF PREFERRED EMBODIMENTS

The packet classification method and system according to the invention is disclosed in full details by way of preferred embodiments in the following with reference to the accompanying drawings.

Application of the Invention

Figure 1:
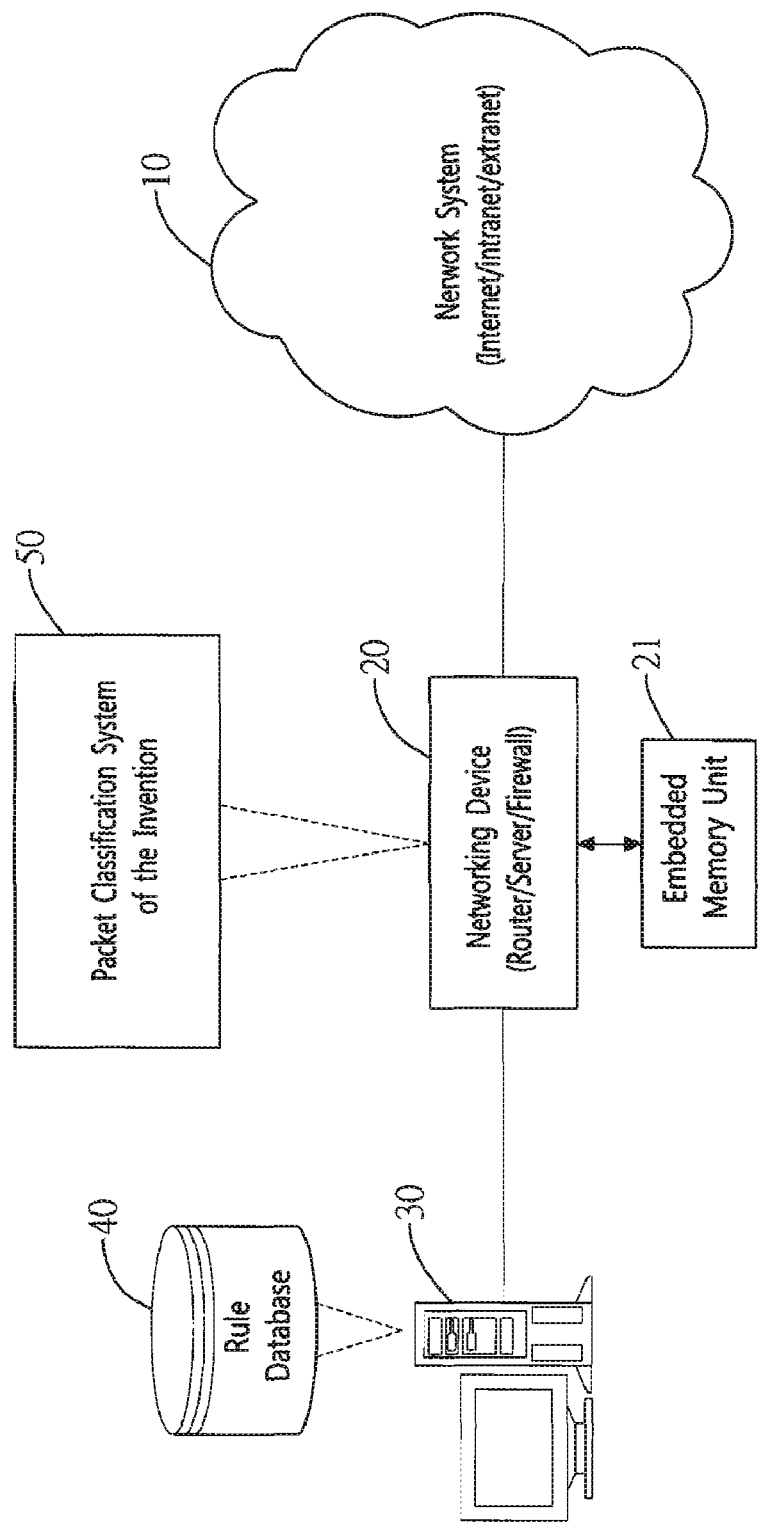
FIG. 1 is a schematic diagram showing the application of the packet classification system of the invention with a network system.

FIG. 1 is a schematic diagram showing the application of the packet classification system according to the invention (which is here encapsulated in a box indicated by the reference numeral 50). As shown, the packet classification system of the invention 50 is designed for use with a networking device, such as a firewall a router, or a server, that is linked between a computer unit 30 (such as a server or a workstation) and a network system 10 such as the Internet, an intranet, an extranet, or a LAN (Local Area Network). For packet transmission, the network system 10 is preferably compliant with the TCP/IP (Transmission Control Protocol/Internet Protocol) standard. For packet classification purpose, a rule database 40 is user-predefined by the network management personnel and stored in the computer unit 30.

Function of the Invention

During operation of the networking device 20, it will receive data packets from the network system 10 or the computer unit 30. Whenever an incoming packet is received, the packet classification system of the invention 50 will be activated to identify the particular type of the incoming packet (i.e., to check which rule in the original rule database 40 is mapped to the incoming packet) to thereby determine which action is to be taken on the received packet, such as discarding the received packet if it is from a malignant source.

The particular packet types that are to be classified are predefined by the user (i.e., network management personnel) and stored in a rule database 40. FIG. 3A shows an example of the rule database 40 specifically devised for the classification of IPv4 (Internet Protocol Version 4) compliant packets. As shown, this rule database 40 contains 5 fields: [SOURCE IP ADDRESS], [DESTINATION IP ADDRESS], [SOURCE PORT], [DESTINATION PORT], and [PROTOCOL], whose values are user-predefined to be mapped to one or more rules in a ruleset of N rules {R(0), R(1), R(2), ..., R(N−1)}. If an incoming packet has a header whose combination of source IP address, destination IP address, source port, destination port, and protocol is matched to a certain rule RULE(i), then the action specified by RULE(i) will be performed on this packet. The network management personnel can predefine this rule database 40 by using the computer unit 30. In addition, FIG. 3B shows the respective bit lengths of the [SOURCE IP ADDRESS], [DESTINATION IP ADDRESS], [SOURCE PORT], [DESTINATION PORT], and [PROTOCOL] fields in the rule database 40 of FIG. 3A. The table of FIG. 3B shows that the source IP address and destination IP address based on the standard IPv4-compliant packet format are 32 bits in length, but in the rule database 40 they are both appended with a prefix of 8 bits, such that the data length of the [SOURCE IP ADDRESS] and [DESTINATION IP ADDRESS] field is 40 bits. The source port and destination port based on the IPv4-compliant packet format are 16 bits in length, but in the original rule database 40 they are both defined as a range with a 16-bit upper-bound value and a 16-bit bottom-bound value, such that the data length of the [SOURCE PORT] and [DESTINATION PORT] fields is 32 bits. The protocol based on the IPv4 standard is 8 bits in length, and in the original rule database 40 is also set as an 8-bit constant value. In the example of FIG. 3A, each rule in the original rule database 40 therefore corresponds to a bit array of 152 bits.

Architecture of the Invention

Figure 2:
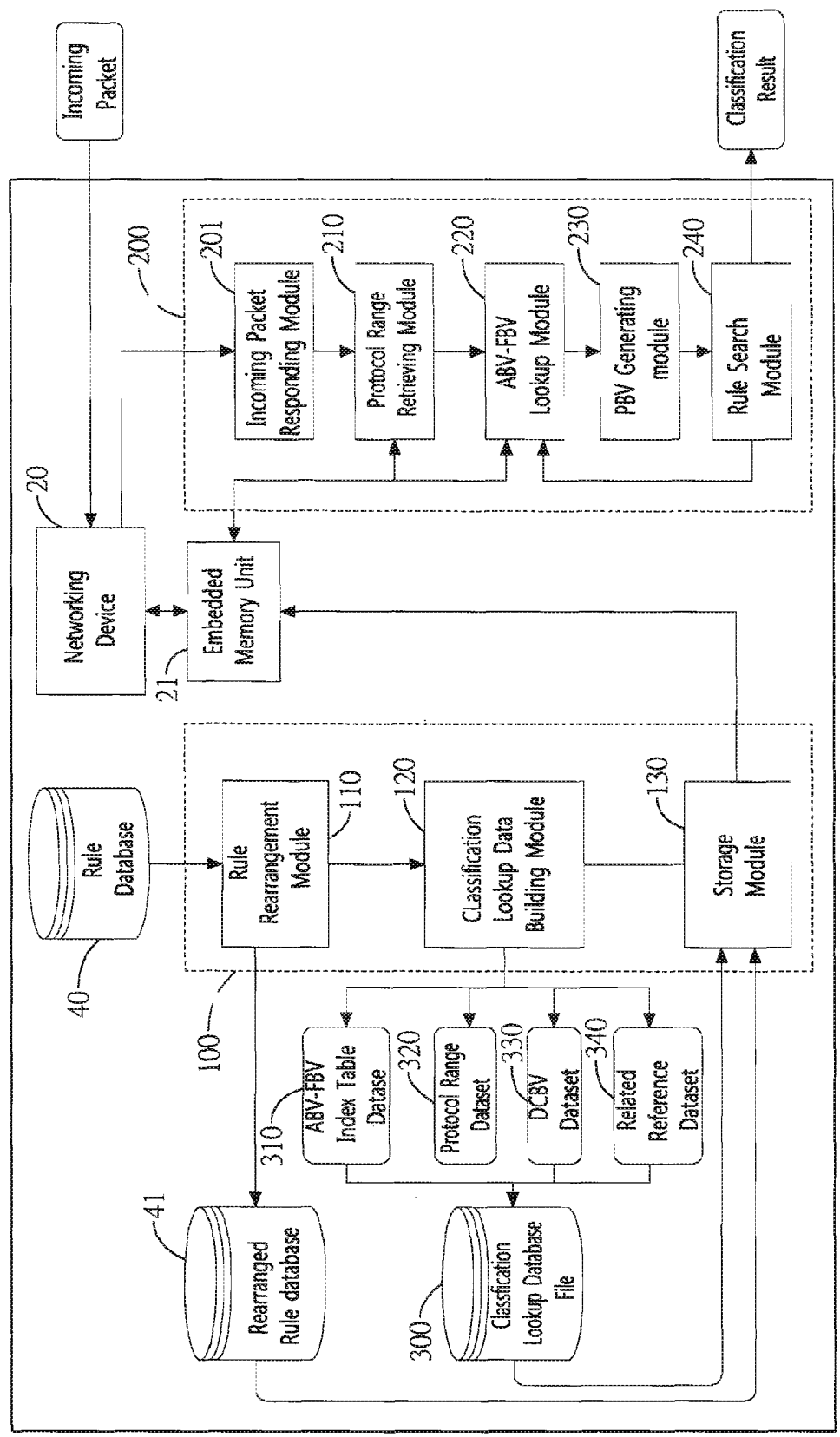
FIG. 2 is a schematic diagram showing the architecture of the packet classification system of the invention.

As shown in FIG. 2, in architecture, the packet classification system of the invention 50 comprises two separate units: (A) a preprocessing unit 100; and (B) a packet processing unit 200; wherein the preprocessing unit 1700 includes: (A1) a rule rearrangement module 110; (A2) a classification lookup data building module 120; and (A3) a storage module 130; whereas the packet processing unit 200 includes: (B0) a packet listening module 201; (B1) a protocol range retrieving module 210; (B2) an ABV-FBV lookup module 220; (B3) a PBV (Probable Bit Vector) generating module 230; and (B4) a rule search module 240.

Firstly, the respective attributes and behaviors of the constituent components of the preprocessing unit 100 are described in details in the following.

The rule rearrangement module 110 is designed to perform a rearrangement on the rules in the rule database 40 based on the order of the user-defined values in the [PROTOCOL] field of the original rule database 40. In accordance with the invention, the rule database 40 of FIG. 3A is rearranged in such a manner that the DON'T-CARE protocol value is rearranged to the topmost position and all protocol-specific values (which are 8 bits in length) are arranged in an ascending order of [0] to [255] following the DON'T-CARE protocol value. If the same protocol value corresponds to two or more rules, then these rules are arranged based on priority settings, i.e., a rule with a higher priority is arranged to the top. Through this rearrangement, a new rule database is created (hereinafter referred to as "rearranged rule database" and indicated by the reference numeral 41 in FIG. 2). As shown in FIG. 3C, a total of 256 bit vectors (BV) can be obtained from the rearranged rule database 41. The rectangular box labeled with the reference numeral 401 indicates the don't-care protocol range, whereas the rectangular box labeled with the reference numeral 402 indicates the packet-specific protocol range corresponding to a protocol value of 2. It can be seen from FIG. 3C that each of the 256 bit vectors contains two segments of consecutive 1s (which is referred to as "protocol range"). The leftmost segment of the consecutive 1s are within the don't-care protocol range, which is common to all of the 256 bit vectors, whereas all the other segments of consecutive 1s are within a packet-specific protocol range, and which is unique to the associated bit vector. For example, the rectangular box 402 indicates a packet-specific protocol range corresponding to a protocol value of 2. Due to the uniqueness of the segment of consecutive 1s within each protocol range, it will be adequate for packet classification by just saving the first bit of each protocol range of consecutive 1s, as indicated by the underlined bit of 1 in FIG. 3C. Therefore, a total of 256 bit positions need to be saved, and each bit position is represented by a data length of 16 bits. As a result, it only requires a total number of 4,096 bits for representing the bit vectors (BV) from the rearranged rule database 41.

The classification lookup data building module 120 is used to build a classification lookup database file 300 which contains an ABV-FBV index table dataset 310, a protocol range dataset 320, a DCBV (Don't-Care Bit Vector) dataset 320, and a related reference dataset 340. Details about these datasets are described in the following.

Figure 4A:
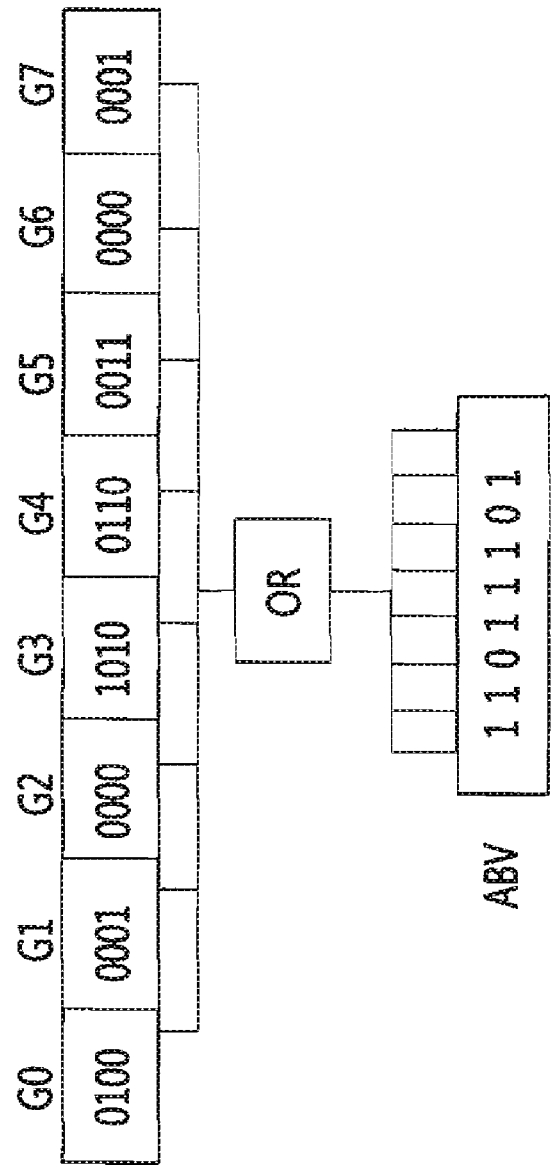
FIGS. 4A-4B are schematic diagrams used to depict the computation for an aggregated bit vector (ABV) and a folded bit vector (FBV) from an original bit vector (BV)
Figure 4B:
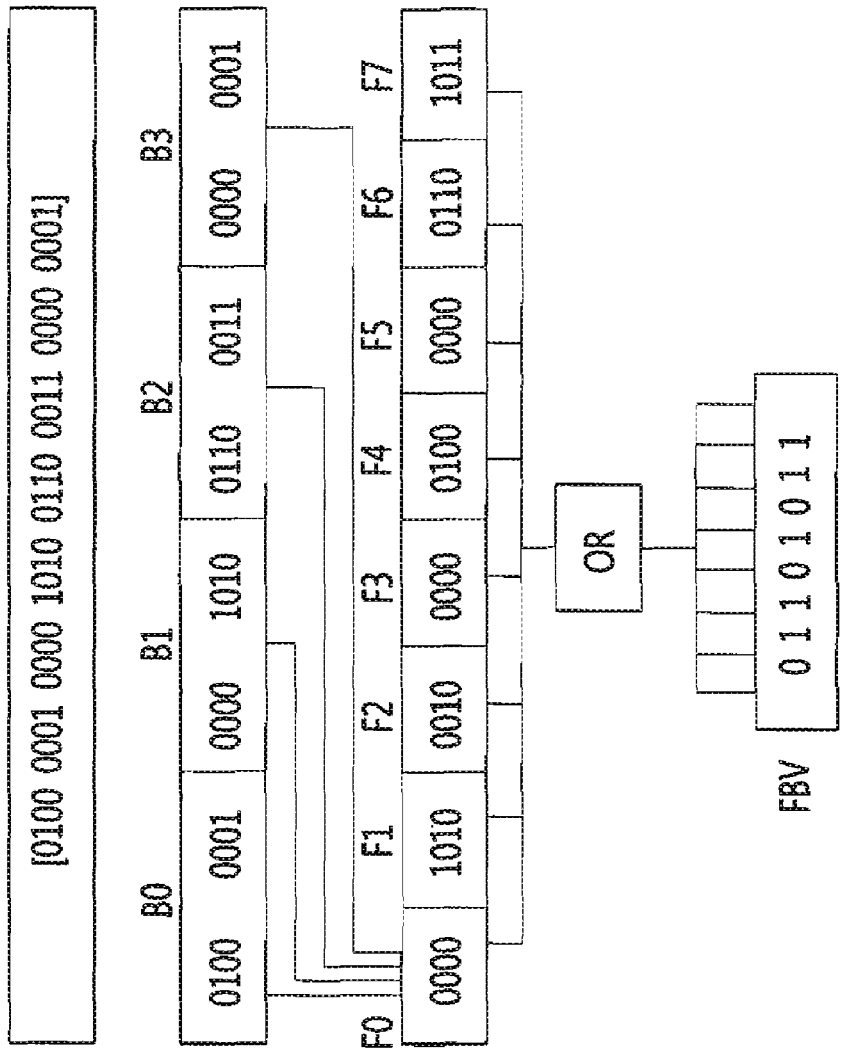

To build the ABV-FBV index table dataset 310, the classification lookup data building module 120 first uses each of the original bit vectors (i.e., Lucent Bit Vectors) obtained from the rearranged rule database 41 to generate an ABV (Aggregated Bit Vector) and an FBV (Folded Bit Vector). The BV-to-ABV conversion process is schematically illustrated in FIG. 4A, whereas the BV-to-FBV conversion process is schematically illustrated in FIG. 4B. The BV-to-ABV conversion and the BV-to-FBV conversion are both existing techniques used in packet classification, so that detailed description thereof will not be given in this specification. Related references about ABV and FBV can be found, for example, in the technical paper entitled "SCALABLE PACKET CLASSIFICATION USING BIT VECTOR AGGREGATING AND FOLDING" by Li et al. In the example of FIG. 4A, if an original BV is [0100 0001 0000 1010 0110 0011 0000 0001], then the bit vector is divided into 4-bit groups: G0, G1, G2, G3, G4, G5, G6, and G7; and next each 4-bit group undergoes a logic-OR operation, and the resulted 8 bits [1101110] are combined to form an aggregated bit vector (ABV). Further, in the example of FIG. 4B, for the same original bit vector BV=[0100 0001 0000 1010 0110 0011 0000 0001], the bit vector is first divided into four 8-bit subgroups: B0, B1, B2, B3, Next, the respective first bits in these subgroups B0, B1, B2, B3 are extracted and combined to form a 4-bit group F0; the respective second bits are extracted and combined to form a 4-bit group F1; and so forth. This results in a sequence of eight 4-bit subgroups: F0, F1, F2, F3, F4, F5, F6, and F7, which then undergoes a logic-OR operation for each subgroup, and the resulted 8 bits [01101011] are combined to form a folded bit vector (FBV). It is an important aspect of the invention that, since the original BV values are quite huge in amount, only the ABV and FBV values are stored and used for packet classification. With this practice, for example, for an original BV having 2048 bits, the resulted ABV and FBV can be both reduced to only 256 bits and thus a total of 512 bits which is only ¼ of the data amount of the original BV.

Figure 5C:
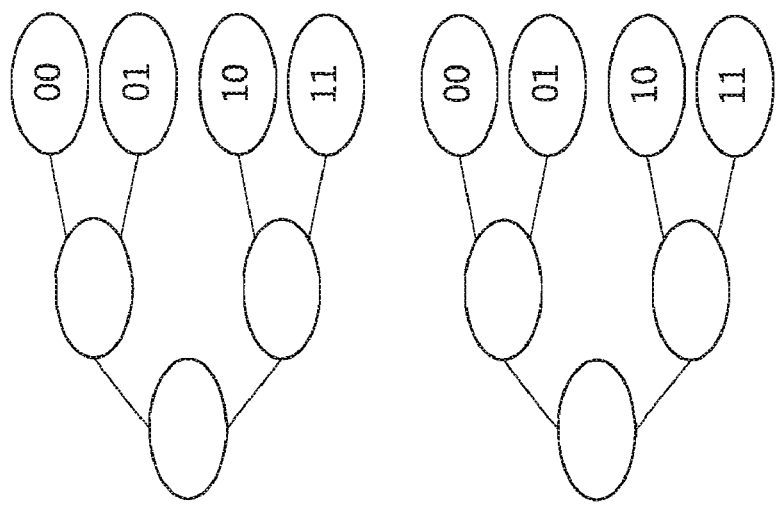
Figure 7:
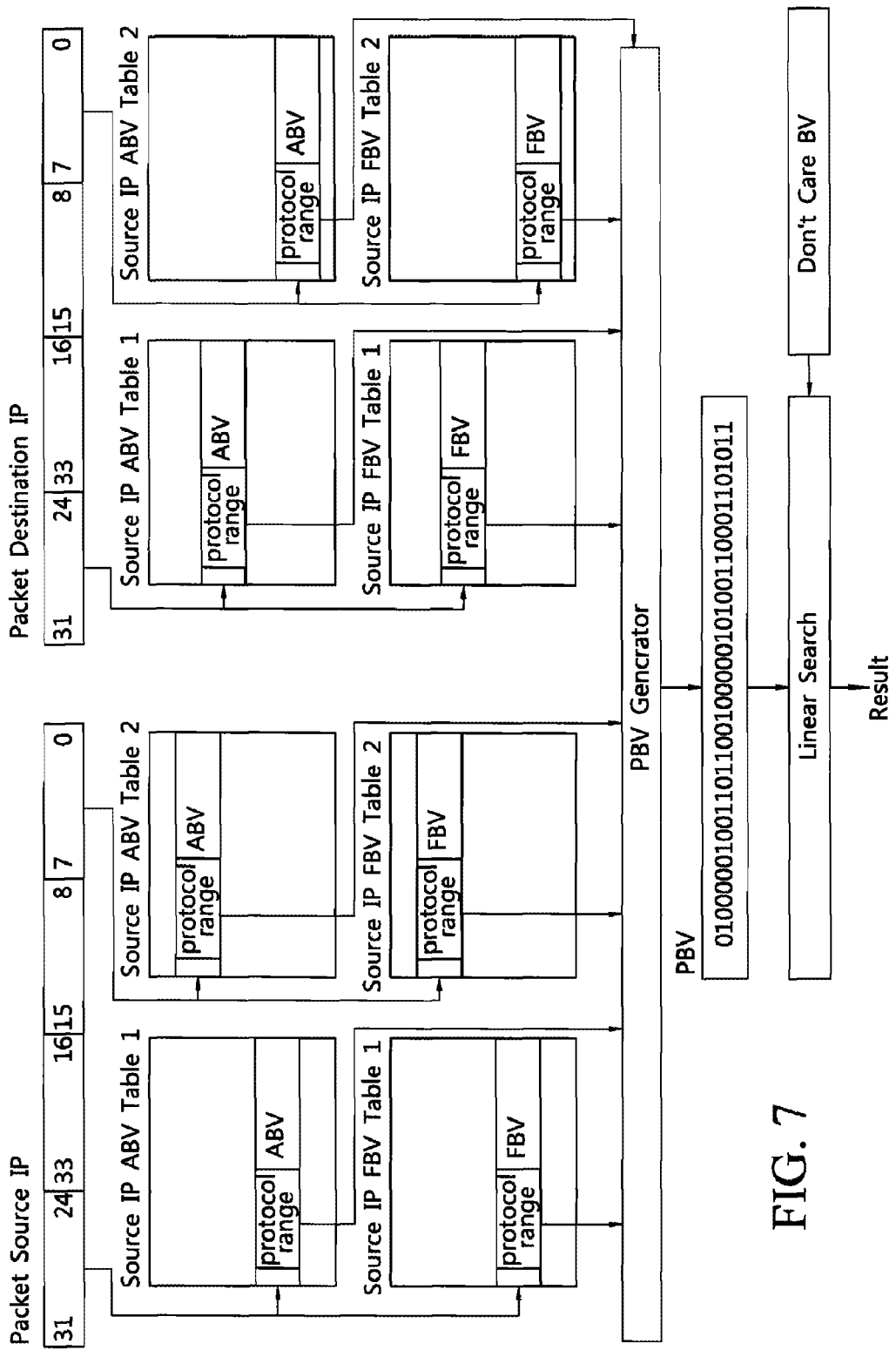
FIG. 7 is a schematic diagram used to depict the operation of packet classification for an incoming packet by the invention.

In accordance with an important aspect of the invention, the building of the ABV-FBV index table 121 is based on a split full-tree schema. The basic concept of this split full-tree schema is depicted with reference to FIGS. 5A-5C. FIG. 5A shows an example of a rule database having two fields: FIELD-1 and FIELD-2 and 8 rules 0-7. In the table of FIG. 5A, FIELD 1 (Prefix) has a bit length of 4, which corresponds to a full tree of 16 leaf nodes. If the full tree is divided into two portions, then each portion will have 4 leaf nodes and two index tables can be created, each table having four rows, as illustrated in FIG. 5C. Then, from the rule database of FIG. 5A, all the rules are categorized based on the foremost two bits: [00], [01], [10], [11]. The BV of each rule category can therefore obtained and inserted into the index table. The resulted index table set is shown in FIG. 5C. If an incoming packet contains a value of [0011] in its FIELD-1 field, the value [0011] is divided into two portions [00] and [11] and then used respectively as an index to retrieve the corresponding BV values from the two index tables shown in FIG. 5C, i.e., the first half portion [00] is used to retrieve the corresponding BV value [00100010] from the first index table, while the second half portion [11] is used to retrieve the corresponding BV value [11110011] from the second index table. In the application of IPv4-compliant packet format, the IP address format (including both the source and destination IP addresses) is split into M segments, where M is a power of 2, such as 2, 4, 8, or 16. In practice, the value of M is preferably 4 or 8 for 32-bit packet classification, and most preferably M=4. In the embodiment of the invention with M=4, the 32-bit IP address is divided by M=4 into four 8-bit segments, as illustrated in FIG. 7; and only the first and the last 8-bit segments are used as indexes for ABV-FBV lookup, while the middle two segments are unused.

The protocol range dataset 320 is derived from the bit matrix shown in FIG. 3C, and which is used to indicate the range for search corresponding to a specific protocol used by the incoming packet. When an incoming packet is received, the protocol value in the packet header will be used as index to retrieve the packet-specific protocol range in the ABV-FBV index table dataset 310 where the search for matched rule is performed.

Figure 6:
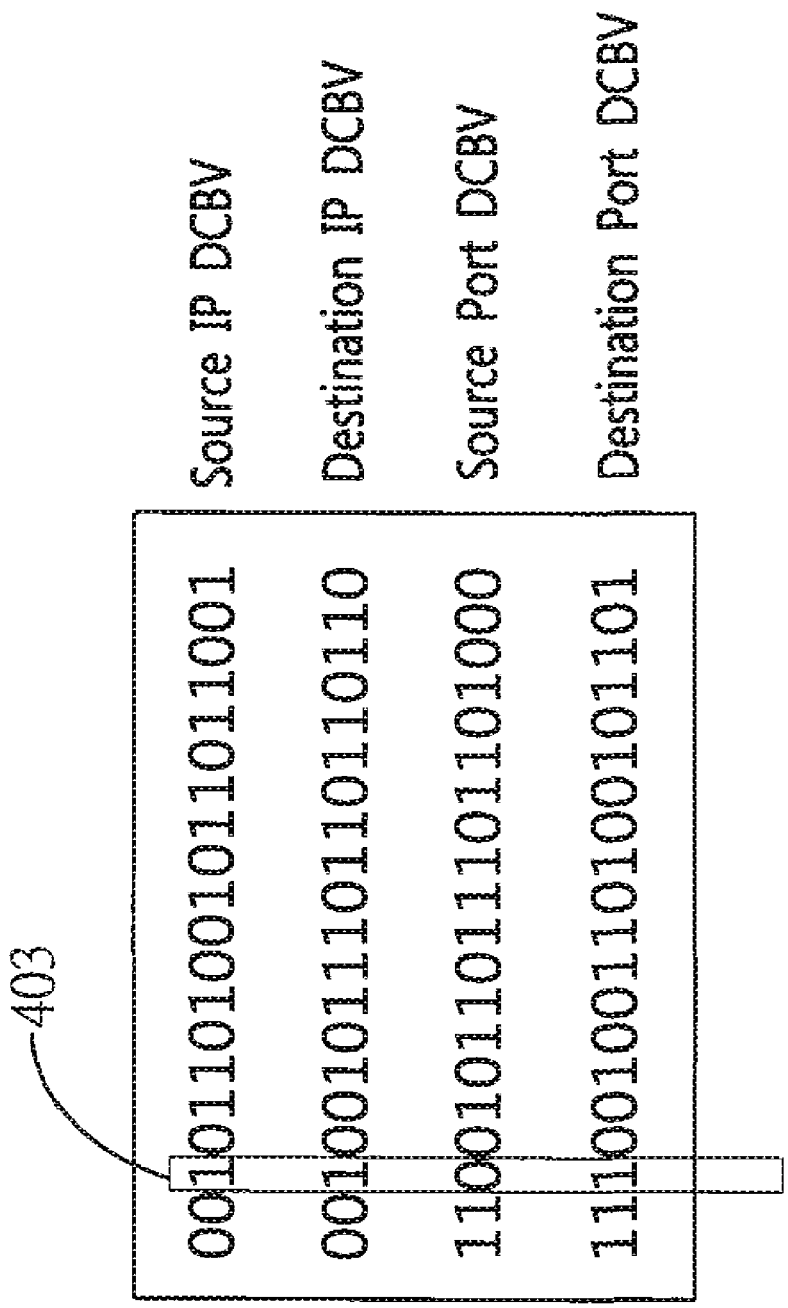
FIG. 6 is a schematic diagram showing an example of a DCBV dataset utilized by the invention for packet classification.

The DCBV dataset 330 is used to indicate those rules in the original rule database 40 that are mapped to don't-care protocols in the packet classification. In the example of the rule database 40 shown in FIGS. 3A-3B, it can be seen that each rule requires a total of 152 bits of storage space. After rule rearrangement, the protocol field in each rule is excluded from storage but requires an additional 16 bits for defining its priority. As a result, each rule requires a total of 160 bits for storage. To reduce memory access, it is an import aspect of the invention that for each rule in the original rule database 40, a bit vector is created for each of the following four fields: source IP address, destination IP address, source port, and destination port. If a certain field in a certain rule is don't-care, then the corresponding bit in the bit vector associated with that rule is set to 1, and otherwise set to 0. A DCBV (Don't-Care Bit Vector) is then formed by combining the four bit vectors associated with each rule, and all the DCBVs are combined to form a DCBV dataset 330. The bit values in the DCBV dataset 330 can be then used to indicate which fields in a certain rule are don't-care. If a certain field is don't care, that field can be ignored in the packet classification process. FIG. 6 shows an example of a DCBV dataset 330 for source IP address, destination IP address, source port, and destination port in the rule database 40. The example of FIG. 6 indicates that if we want to determine whether an incoming packet matches the third rule (as indicated by the rectangular box 403), since bit value 1 indicates don't-care and the only bit value 0 found in the bit vectors is associated with the source port field, the classification process can ignore the source IP, destination IP, and destination port, and needs just to check the source port to see if there is a match.

The related reference dataset 340 is used to store a set of related reference data for packet classification, such as the total number of rules in the original rule database 40, the priority of the first found rule irrespective of protocol range, and so on.

The storage module 130 is used to store the ABV-FBV index table dataset 310, the protocol range dataset 320, the DCBV dataset 330, and the related reference dataset 340 as well as the rearranged rule database 41 into the embedded memory unit 21 of the networking device 20 for use in the packet classification process when the networking device 20 receives an incoming packet. Preferably, the ABV-FBV index table dataset 310, the protocol range dataset 320, the DCBV dataset 330, and the related reference dataset 340 are compiled into a single file, called classification lookup database file 300 for storage into the embedded memory unit 21. In actual implementation, for example, the embedded memory unit 21 can be either an off-chip RAM or an on-chip Block RAM.

Next, the respective attributes and behaviors of the constituent components of the packet processing unit 200 are described in details in the following.

The packet listening module 201 is an event listener module which is capable of listening to the event of an incoming packet to the networking device 20, and responding to the incoming of each packet by issuing an activation message to start the packet classification system of the invention 50 to perform a packet classification process on the incoming packet. In response to this activation message, the protocol range retrieving module 210 is first started.

The protocol range retrieving module 210 is capable of first checking the protocol value in the header of the incoming packet, and then using the protocol value as an index to retrieve the corresponding packet-specific protocol range from the protocol range dataset 320 stored in the embedded memory unit 21. The retrieved data includes the upper-bound value and bottom-bound value of the packet-specific protocol range. The search for each rule corresponding to the incoming packet will be performed within two ranges: the packet-specific protocol range and the don't-care protocol range.

The ABV-FBV lookup module 220 is capable of checking the source IP address and destination IP address of the incoming packet and using the source IP address and destination IP address as indexes for retrieving the corresponding ABV and FBV values from the ABV-FBV index table dataset 310 prestored in the embedded memory unit 21 of the networking device 20. The ABV-FBV lookup mechanism is schematically illustrated in FIG. 7. Each pair of retrieved ABV-FBV values are then transferred to the PBV generating module 230.

Figure 8:
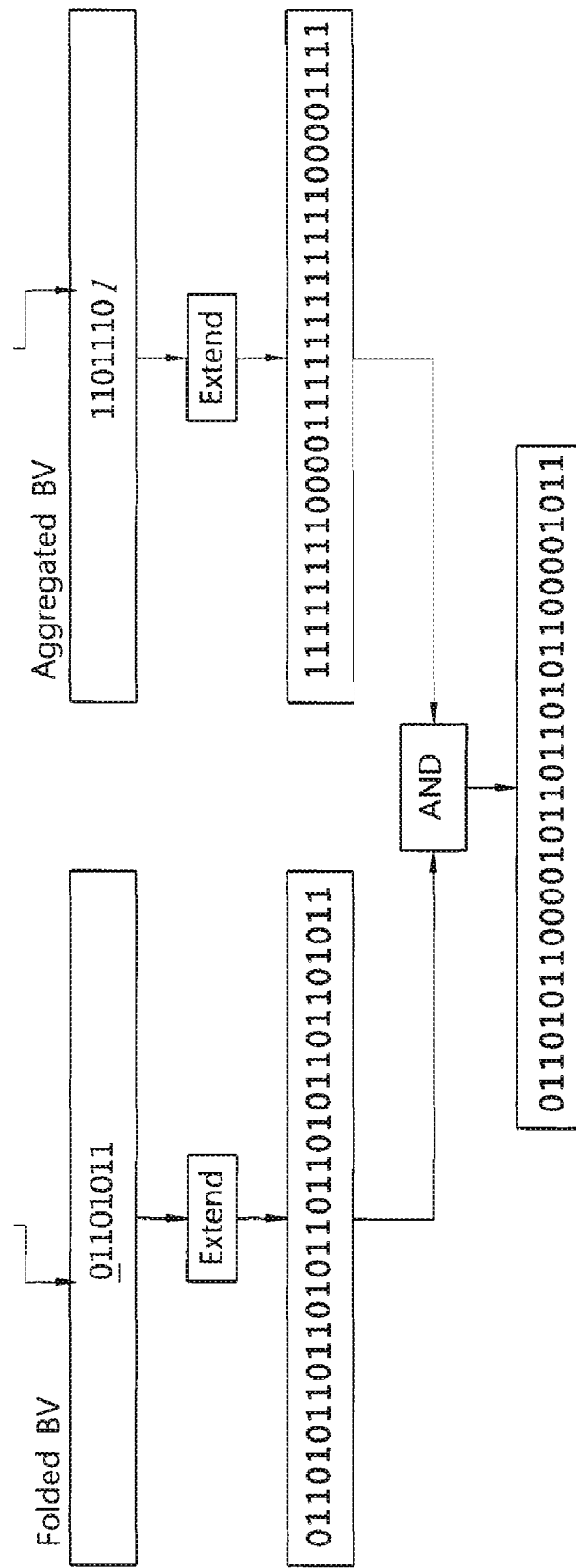
FIG. 8 is a schematic diagram used to depict the computation for obtaining a PBV from an ABV and an FBV.

The PBV generating module 230 is capable of generating a PBV (Probable Bit Vector) based on each pair of ABV and FBV values retrieved by the ABV-FBV lookup module 220 from the ABV-FBV index table dataset 310. The computation process is schematically illustrated in FIG. 8. As shown, each retrieved pair of 8-bit FBV and ABV are first extended through duplication and arrangement into 32-bit bit vectors, and then the two extended bit vectors undergoes a logic-AND operation which results in the production of a 32-bit probable bit vector (PBV).

The rule search module 240 is capable of performing a linear search through the PBV to find every rule that is matched to the incoming packet, respectively within the don't-care protocol range and the packet-specific protocol range. During this process, the DCBV dataset 330 can also be referenced to speed up the search by ignoring don't-care fields. If two or more rules are found respectively from the don't-care protocol range and the packet-specific protocol range, the one with higher priority is returned. Otherwise, if no rule is found, a no-hit message is returned.

Operation of the Invention

The following is a detailed description of the operation of the packet classification system of the invention 50. The operation of the packet classification system of the invention 50 includes two stages: a preprocessing stage and a packet processing stage, where the preprocessing stage is initiated by the user in advance to build a classification lookup database file 300 for storage in the embedded memory unit 21 of the networking device 20, and the packet processing stage is initiated when the networking device 20 is in active operation in response to the reception of an incoming packet.

Figure 9A:
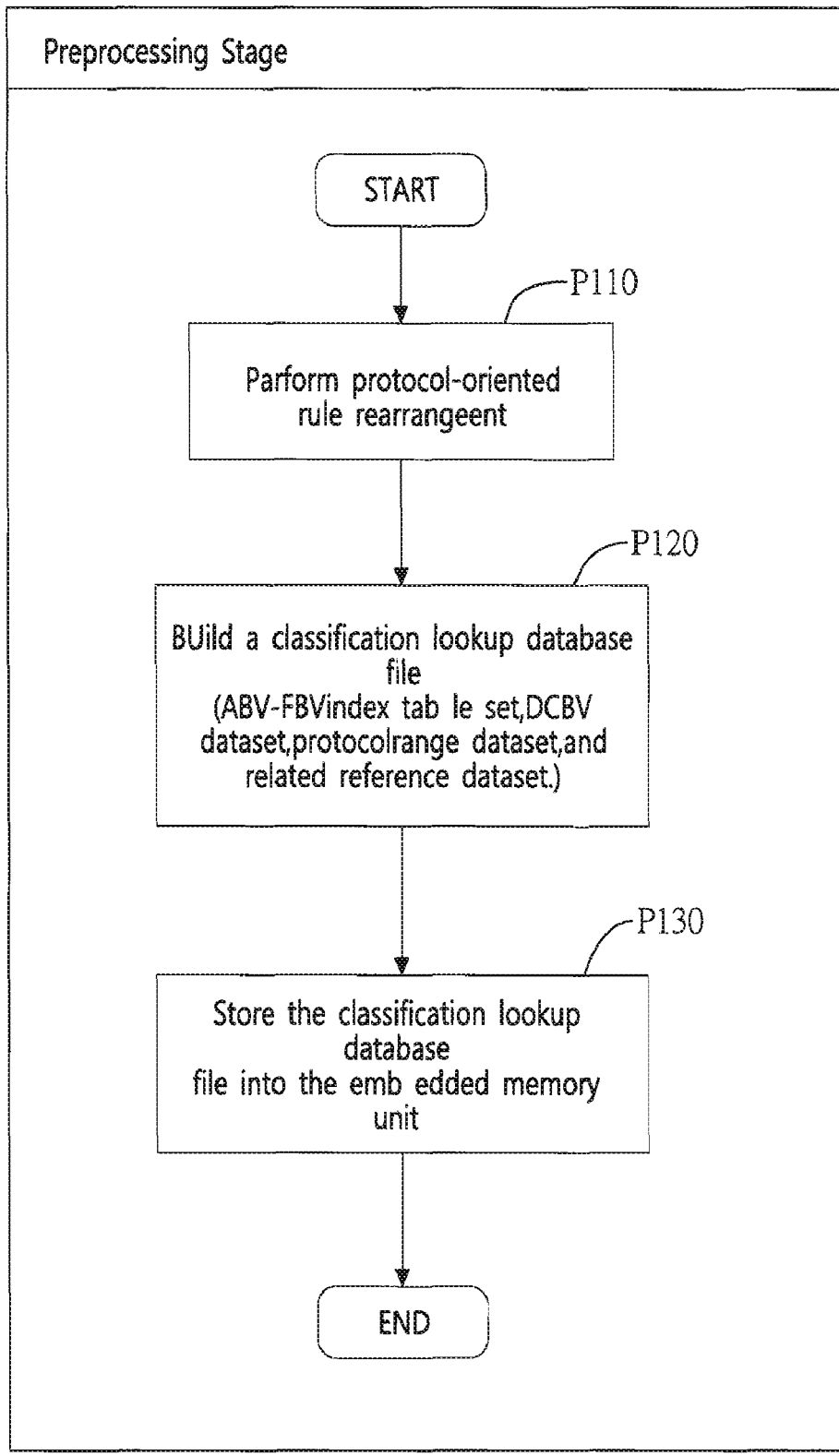
FIG. 9A is a flow diagram showing the procedural steps involved in the preprocessing stage of the operation performed by the invention.

Referring to FIG. 9A, in the preprocessing stage, the first step P110 is to activate the rule rearrangement module 110 to perform rule rearrangement on the original rule database 40 based on the user-preset values in the [PROTOCOL] field and thereby create a rearranged rule database 41 from which a number of bit vectors (BV) are obtained.

In the next step P120, the classification lookup data building module 120 is activated to build an ABV-FBV index table dataset 310, a protocol range dataset 320, a DCBV dataset 330, and a related reference dataset 340. These datasets are preferably complied into a single file, namely the classification lookup database file 300.

Finally, in the step P130, the storage module 130 is activated to store the classification lookup database file 300 into the embedded memory unit 21 of the networking device 20. The stored data in the embedded memory unit 21 will be hereafter used in the packet processing stage for classification of each incoming packet during active operation of the networking device 20.

Figure 9B:
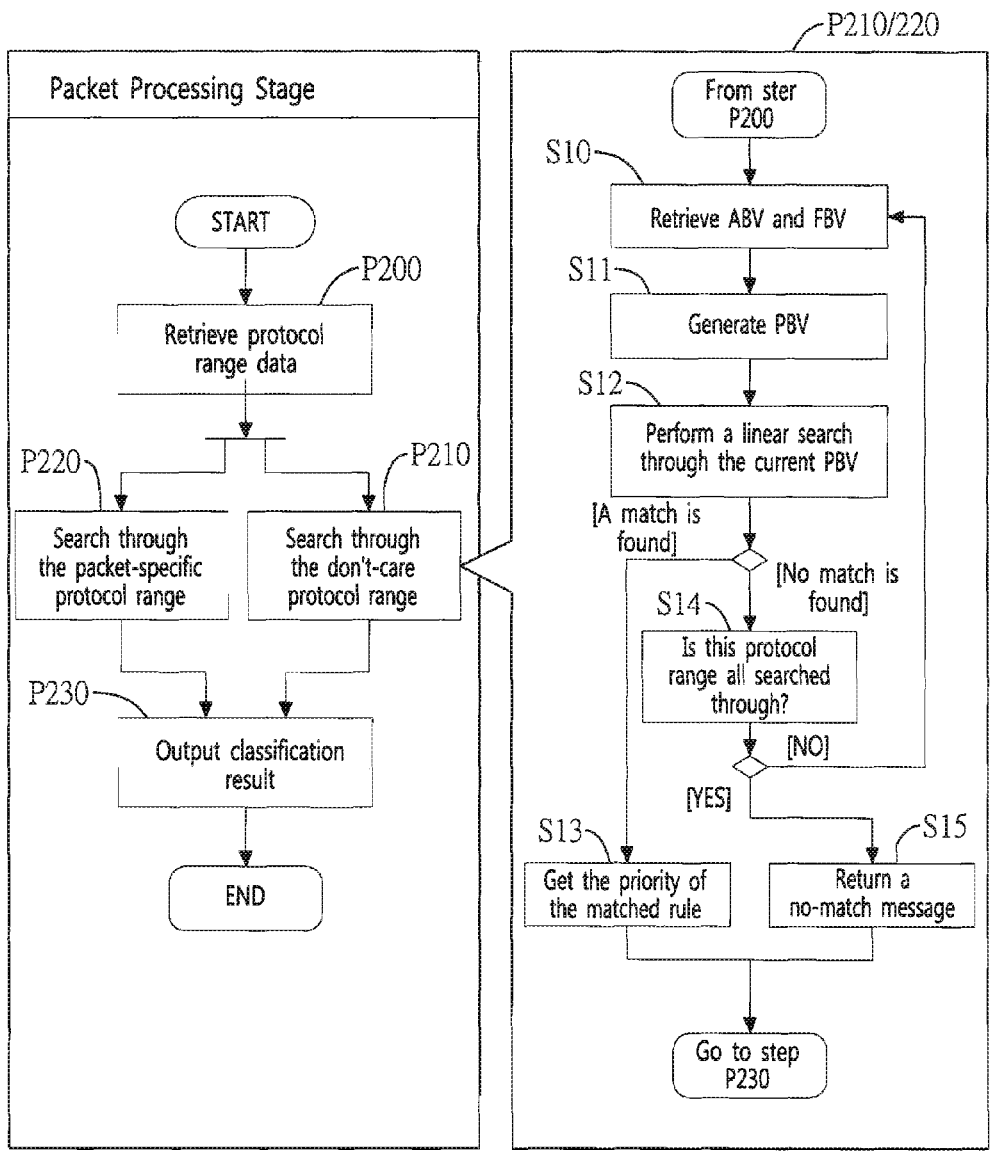
FIG. 9B is a flow diagram showing the procedural steps involved in the packet processing stage of the operation performed by the invention.

Referring next to FIG. 9B, in the packet processing stage when an incoming packet is received, the first step P200 is to activate the protocol range retrieving module 210 to read the protocol value in the header of the incoming packet and then retrieve the corresponding protocol range from the protocol range dataset 320 prestored in the embedded memory unit 21 of the networking device 20. The retrieved protocol range data includes the upper-bound value and the bottom-bound value of the packet-specific protocol range. In this example, it is assumed that the protocol of the incoming packet is represented by [0000 0010], i.e., the decimal value of [2]. Then, as shown in FIG. 3C, the search for corresponding rules will be performed within two protocol ranges: (1) the don't-care protocol range, as the part enclosed within the rectangular box 401 shown in FIG. 3C; and (2), the packet-specific protocol range, as the part enclosed within the rectangular box 402 shown in FIG. 3C.

As shown in the flow diagram of FIG. 9B, the search through the don't-care protocol range is represented by the procedure P210, whereas the search through the packet-specific protocol range is represented by the procedure P220. The procedural steps involved in these two procedures 210, 220 are the same, which are shown as steps S10-S15 in FIG. 9B.

In each search process, the first step S10 is to use the header information of the incoming packet (i.e., source IP address and destination IP address) as indexes to retrieve corresponding ABV-FBV values (in this embodiment, 32 bits each retrieval) from the ABV-FBV index table dataset 310 prestored in the embedded memory unit 21 of the networking device 20, as illustrated in FIG. 7.

In the next step S11, the currently-retrieved pair of ABV and FBV are processed to obtain a PBV, as illustrated in FIG. 8. Subsequently, in the step S12, a linear search is performed on the PBV to find each matched rule (if any). If a match is found, the procedure goes to the step S13 to get the priority of the matched rule; and the procedure then goes to the step P130.

On the other hand, if no match is found in the current PBV and the following step S14 determines that the search through the current protocol range hasn't been completed, then the procedure jumps back to the step S10 to retrieve the next pair of 32-bit ABV-FBV values and repeat the steps S11-S12 again. This procedure is reiterated until a match is found or all the ABV-FBV values within this protocol range have been accessed and used. If no match is found, a no-match message is returned, and the procedure goes to the step P130.

In the step P130, the two search results from the don't-care protocol range and the packet-specific protocol range are compared. If both of the two search processes found no matches, a no-hit message is outputted as the end result. Whereas, if the two search processes each found a matched rule, the two found rules are compared to check which one has the higher priority, and the rule with the higher priority is outputted as the end result.

In comparison with the prior art, the invention can help reduce memory space and enhance memory access speed during the packet classification process. For example, for a rule database having N rules (N≦64 k), if the invention is implemented with an aggregation unit A, a folding group unit S, a folding constant sum F, a leaf node number L for each full tree resulted from IP address segmentation, a total of T1 ABV-lookup full trees, a total of T2 FBV-lookup full trees, and a port field grouping number P, then in this case the following list shows the required memory storage space for each data modules utilized by the invention:

| Data | Required Memory Space |
|---|---|
| Rule Database: | N * 532/8 bytes |
| Protocol Range Dataset | 256 * 16 = 4096 bits = 512 bytes |
| DCBV Dataset | 0 or N * 4/8 bytes |
| Individual ABV | N/A/8 bytes |
| Individual FBV | [(N/S) * F]/8 bytes |
| All ABVs and FBVs (ABV-FBV Index Table Dataset) | L * {T1 * (N/A/8) + T2 * [N/S) * F]/8)} = N * L * [T1/A + T2/S * F]/8 bytes |
| Ports Used | {N/A/8 + [(N/S) * F]/8} * 2 * P bytes |

Therefore, in the case of the DCBV dataset being used, the total memory space required is:

$$N*\{160+L*[T1/A+T2/S*F]+[2/A+2F/S]*P+4\}/8+512 \text{ (bytes)}$$

On the other hand, in the case of excluding the DCBV dataset, the total memory space required is:

$$N*\{160+L*[T1/A+T2/S*F]+[2/A+2F/S]*P\}/8+512 \text{ (bytes)}$$

It can be learned from these formulas that the invention can be implemented with a few amount of memory space and the amount of memory space is related to the number of rules only and is not related to the distribution of the given rules. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A packet classification method applicable to a packet classification system for packet classification on a networking device having an embedded memory unit and associated with a user-predefined original rule database at least having a source IP address field, a destination IP address field, a source port field, a destination port field, and a protocol field, the packet classification system having a preprocessing unit and a packet processing unit, the preprocessing unit including a rule rearrangement module and a classification lookup data building module, the packet processing unit including a protocol range retrieving module, an ABV-FBV lookup module, a probable bit vector generating module and a rule search module, the packet classification method comprising:

a preprocessing stage and a packet processing stage; wherein the preprocessing stage includes:

utilizing the rule rearrangement module to perform a protocol-oriented rule rearrangement process on the user-predefined original rule database based on user-preset values in the protocol field of the user-predefined original rule database, wherein the user-predefined original rule database is rearranged in such a manner that a DON'T-CARE protocol value is rearranged to a topmost position and all protocol-specific values are arranged in an ascending order following the DON'T-CARE protocol value;

utilizing the classification lookup data building module to build a classification lookup database file which at least includes an ABV-FBV index table dataset and a protocol range dataset based on the rearranged rule database, the ABV-FBV index table dataset having a split full-tree schema; and storing the classification lookup database file into the embedded memory unit of the networking device;

and wherein the packet processing stage is performed in response to an incoming packet to the networking device during active operation of the networking device, and which includes:

utilizing the protocol range retrieving module to check the protocol of the incoming packet and use the protocol value of the incoming packet as an index to retrieve a corresponding packet-specific protocol range from the protocol range dataset prestored in the embedded memory unit of the networking device;

utilizing the ABV-FBV lookup module to check a source IP address and destination IP address of the incoming packet and use the source IP address and destination IP address as indexes to retrieve corresponding sets of aggregated bit vectors and folded bit vectors from the ABV-FBV index table dataset prestored in the embedded memory unit of the networking device;

utilizing the probable bit vector generating module to generate a probable bit vector based on each retrieved pair of aggregated bit vector and folded bit vector from the ABV-FBV index table dataset; and utilizing the rule search module to perform a search through the probable bit vector within a don't-care protocol range and the packet-specific protocol range to find every rule in the user-predefined original rule database that is matched to the incoming packet, and then return a higher-prioritized rule as the end result of the packet classification.

2. The packet classification method of claim 1, wherein the network system is a TCP/IP (Transmission Control Protocol/Internet Protocol) compliant network system.

3. The packet classification method of claim 1, wherein the networking device is a server.

4. The packet classification method of claim 1 wherein the networking device is a firewall.

5. The packet classification method of claim 1, wherein the networking device is a router.

6. The packet classification method of claim 1, wherein the classification lookup database file further includes a DCBV (Don't-Care Bit Vector) dataset which stores a set of don't-care bit vectors that define a number of don't-care positions in packet classification.

7. The packet classification method of claim 1, wherein, if the same protocol value corresponds to two or more rules, the two or more rules are arranged based on priority settings.

8. The packet classification method of claim 7, wherein the priority settings indicate that a rule with a higher priority is arranged to a topper position than another rule with a lower priority.

9. The packet classification method of claim 1, wherein a first bit of each protocol range of consecutive 1's is stored in the original rule database.

10. The packet classification method of claim 1, wherein, for each rule in the original rule database, four bit vectors are created for the source IP address, destination IP address, source port, and destination port fields, respectively.

11. The packet classification method of claim 10, wherein, if a certain field in a certain rule is don't-care, the corresponding bit in the bit vector associated with the certain rule is set to 1, and otherwise set to 0.

12. The packet classification method of claim 10, wherein the four bit vectors are combined to form a Don't-Care Bit Vector (DCBV), and all the DCBVs are combined to form a DCBV dataset, in which bit values indicate which fields in the certain rule are don't-care.

13. A packet classification system for integration to a networking device having an embedded memory unit and associated with a user-predefined original rule database at least having a source IP address field, a destination IP address field, a source port field, a destination port field, and a protocol field; the packet classification system comprising:
a preprocessing unit and a packet processing unit, wherein the preprocessing unit includes:
a rule rearrangement module, which is capable of performing a protocol-oriented rule rearrangement process on the user-predefined original rule database based on user-preset values in the protocol field of the user-predefined original rule database, wherein the user-predefined original rule database is rearranged in such a manner that a DON'T-CARE protocol value is rearranged to a topmost position and all protocol-specific values are arranged in an ascending order following the DON'T-CARE protocol value;
a classification lookup data building module, which is capable of building a classification lookup database file which at least includes an ABV-FBV index table dataset and a protocol range dataset based on the rearranged rule database, the ABV-FBV index table dataset having a split full-tree schema; and
a storage module, which is capable of storing the classification lookup database file into the embedded memory unit of the networking device;
and wherein the packet processing unit is activated to operate in response to an incoming packet to the networking device, and which includes:
a protocol range retrieving module, which is capable of checking the protocol of the incoming packet and using a protocol value of the incoming packet as an index to retrieve a corresponding packet-specific protocol range from the protocol range dataset prestored in the embedded memory unit of the networking device;
an ABV-FBV lookup module, which is capable of checking a source IP address and destination IP address of the incoming packet and using the source IP address and destination IP address as indexes to retrieve corresponding sets of aggregated bit vectors and folded bit vectors from the ABV-FBV index table dataset prestored in the embedded memory unit of the networking device;
a probable bit vector generating module, which is capable of generating a probable bit vector (PBV) based on each retrieved pair of aggregated bit vector and folded bit vector from the ABV-FBV index table dataset; and
a rule search module, which is capable of performing a search through the probable bit vector within the don't-care protocol range and the packet-specific protocol range to find every rule in the user-predefined original rule database that is matched to the incoming packet, and then returning a higher-prioritized rule as the end result of the packet classification.

14. The packet classification system of claim 13, wherein a first bit of each protocol range of consecutive 1's is stored in the original rule database.

15. The packet classification system of claim 13, wherein, for each rule in the original rule database, four bit vectors are created for the source IP address, destination IP address, source port, and destination port fields, respectively.

16. The packet classification system of claim 15, wherein, if a certain field in a certain rule is don't-care, the corresponding bit in the bit vector associated with the certain rule is set to 1, and otherwise set to 0.

17. The packet classification system of claim 15, wherein the four bit vectors are combined to form a Don't-Care Bit Vector (DCBV), and all the DCBVs are combined to form a DCBV dataset, in which bit values indicate which fields in the certain rule are don't-care.

18. The packet classification system of claim 13, wherein the classification lookup database file further includes a DCBV (Don't-Care Bit Vector) dataset which stores a set of don't-care bit vectors that define a number of don't-care positions in packet classification.

19. The packet classification system of claim 13, wherein, if the same protocol value corresponds to two or more rules, the two or more rules are arranged based on priority settings.

20. The packet classification system of claim 19, wherein the priority settings indicate that a rule with a higher priority is arranged to a topper position than another rule with a lower priority.

* * * * *

UNITED STATES PATENT AND TRADEMARK OFFICE
CERTIFICATE OF CORRECTION

PATENT NO. : 7,953,082 B2  
APPLICATION NO. : 12/147916  
DATED : May 31, 2011  
INVENTOR(S) : Sheng-Hsun Cho It is certified that error appears in the above-identified patent and that said Letters Patent is hereby corrected as shown below:

Column 2, line 12 "database; M13 building a classification lookup database file" should read --database; M12 building a classification lookup database file--

Column 2, line 35 "specific protocol range to find even, rule in the original rule" should read --specific protocol range to find every rule in the original rule--

Column 4, line 32 "200; wherein the preprocessing unit 1700 includes: (A1) a" should read --200; wherein the preprocessing unit 100 includes: (A1) a--

Column 5, line 38 "a logic-OR operation, and the resulted 8 bits [1101110] are" should read --a logic-OR operation, and the resulted 8 bits [11011101] are--

Signed and Sealed this  
Twenty-fifth Day of October, 2011

David J. Kappos  
*Director of the United States Patent and Trademark Office*